(12) United States Patent
Oh

(10) Patent No.: US 8,453,055 B2
(45) Date of Patent: May 28, 2013

(54) USER INTERFACE APPARATUS AND METHOD FOR USER INTERFACE IN TOUCH DEVICE

(75) Inventor: Jeong Won Oh, Seoul (KR)

(73) Assignee: Pantech Co., Ltd., Seoul (KR)

( * ) Notice: Subject to any disclaimer, the term of this patent is extended or adjusted under 35 U.S.C. 154(b) by 585 days.

(21) Appl. No.: 12/612,303

(22) Filed: Nov. 4, 2009

(65) Prior Publication Data

US 2010/0306650 A1  Dec. 2, 2010

(30) Foreign Application Priority Data

May 26, 2009  (KR) .......................... 10-2009-0045805

(51) Int. Cl.
*G06F 3/01* (2006.01)
*G06F 3/00* (2006.01)

(52) U.S. Cl.
USPC ............................ 715/702; 715/707; 715/745

(58) Field of Classification Search
USPC ......................................... 715/702, 707, 745
See application file for complete search history.

(56) References Cited

U.S. PATENT DOCUMENTS

| | | | | |
|---|---|---|---|---|
| 5,991,735 | A * | 11/1999 | Gerace | 705/7.33 |
| 6,633,315 | B1 * | 10/2003 | Sobeski et al. | 715/762 |
| 8,134,538 | B2 * | 3/2012 | Nakayama | 345/173 |
| 2006/0077183 | A1 * | 4/2006 | Studt | 345/173 |
| 2007/0236478 | A1 * | 10/2007 | Geaghan et al. | 345/173 |
| 2008/0084389 | A1 * | 4/2008 | Mac | 345/158 |
| 2008/0122796 | A1 * | 5/2008 | Jobs et al. | 345/173 |
| 2008/0133748 | A1 * | 6/2008 | Nicholas | 709/224 |
| 2009/0327890 | A1 * | 12/2009 | Mertz et al. | 715/716 |
| 2010/0077334 | A1 * | 3/2010 | Yang et al. | 715/769 |
| 2010/0231504 | A1 * | 9/2010 | Bloem et al. | 345/156 |
| 2011/0016390 | A1 * | 1/2011 | Oh et al. | 715/702 |
| 2011/0061010 | A1 * | 3/2011 | Wasko | 715/769 |
| 2011/0072492 | A1 * | 3/2011 | Mohler et al. | 726/3 |
| 2011/0131521 | A1 * | 6/2011 | Cho et al. | 715/772 |
| 2011/0216095 | A1 * | 9/2011 | Rydenhag | 345/676 |
| 2011/0239145 | A1 * | 9/2011 | Kim | 715/765 |
| 2011/0242024 | A1 * | 10/2011 | Fukumoto et al. | 345/173 |
| 2011/0319131 | A1 * | 12/2011 | An et al. | 455/556.1 |

FOREIGN PATENT DOCUMENTS

| | | |
|---|---|---|
| CN | 1855021 | 11/2006 |
| EP | 1278116 | 1/2003 |

* cited by examiner

*Primary Examiner* — David Phantana-Angkool
(74) *Attorney, Agent, or Firm* — H.C. Park & Associates, PLC

(57) ABSTRACT

A user interface apparatus includes a position identification unit to identify a first position where a first touch is generated on a display screen; a priority assignment unit to respectively assign priorities to menu items displayed on the display screen; and a menu item movement unit to move the menu items to the first position as a destination according to the assigned priorities and in response to the first touch. A user interface method in a touch device includes identifying a first position where a first touch is generated on a display screen, respectively assigning priorities to menu items displayed on the display screen, and moving the menu items to the first position according to the assigned priorities in response to receiving the first touch.

15 Claims, 14 Drawing Sheets

USER INTERFACE APPARATUS AND METHOD FOR USER INTERFACE IN TOUCH DEVICE

CROSS-REFERENCE TO RELATED APPLICATION

This application claims priority from and the benefit of Korean Patent Application No. 10-2009-0045805, filed on May 26, 2009, which is hereby incorporated by reference for all purposes as if fully set forth herein.

BACKGROUND OF THE INVENTION

1. Field of the Invention

Embodiments of the present invention relate to a user interface apparatus and method for user interface, and more particularly, to a user interface apparatus and method for user interface in a touch device where menu items displayed on a display screen may move to a position where a user's touch is generated according to assigned priorities.

2. Discussion of the Background

In general, when executing an application such as Window Explorer in a personal computer (PC), a user must identify a position of a menu for Window Explorer among menus listed on Background or an opened window, move a pointer on a monitor screen directly to the menu by operating a mouse device and then select the menu. Therefore, it takes a time to reach the menu, and operational cost is increased.

To solve such a problem, a technique has been proposed for allowing a user to more rapidly execute a desired application by using a space among movable objects displayed on a display screen.

FIG. 1 and FIG. 2 are views illustrating a user interface method according to a related art.

In the related art, as illustrated in FIG. 1, a standby screen includes moving fish-shaped icons respectively related to applications such as TV, Alarm, Calendar, Album and Message. When a point in the space among the icons is clicked as illustrated in FIG. 2, three icons gather around the clicked point so that it is unnecessary for the user to initially touch an icon related to the application to be executed by the user.

However, in the related art, icons within a range from the clicked point gather around the clicked point, or a selected number of icons gather around the clicked point. Therefore, before clicking a point in the space between the icons, the user should still identify a position of the icon related to the application to be executed and then click a point near the identified position.

When all the icons are gathered around the clicked point, the user may not identify the position of the icon related to the application to be executed. Further, the circumference of the clicked point may be disorganized, and so it may be difficult for the user to distinguish the icons from one another.

Accordingly, there is a need for a technique in which, when a touch is generated, menu items distributed and displayed on a display screen are moved to a position where the touch is generated. It would also be helpful to provide a technique in which a user may more easily distinguish the menu items from one another.

SUMMARY OF THE INVENTION

Exemplary embodiments of the present invention provide a user interface apparatus and method for user interface in a touch device, where menu items displayed on a display screen all move to a first position where a first touch is generated.

Exemplary embodiments of the present invention also provide a user interface apparatus and method for user interface in a touch device, where priorities are assigned to menu items based on various references such as respective frequencies of use, respective distances from the first position, and user settings, and display of the menu items at the first position is according to the assigned priorities.

Exemplary embodiments of the present invention also provide a user interface apparatus and method for user interface in a touch device, wherein if a first touch, such as a double click, is repeatedly generated at a same position within a set period of time, a menu item with a highest priority is selectively moved to a position corresponding to the first touch, and an application associated with the menu item may be executed.

Additional features of the invention will be set forth in the description which follows, and in part will be apparent from the description, or may be learned by practice of the invention.

An exemplary embodiment of the present invention discloses a user interface apparatus in a touch device, which comprises a position identification unit to identify a first position where a first touch is generated on a display screen; a priority assignment unit to respectively assign priorities to menu items displayed on the display screen; and a menu item movement unit to move the menu items to the first position according to the assigned priorities in response to receiving the first touch.

An exemplary embodiment of the present invention discloses a method for user interface in a touch device, which comprises identifying a first position where a first touch is generated on a display screen; respectively assigning priorities to menu items displayed on the display screen; and moving the menu items to the first position as a destination according to the assigned priorities in response to receiving the first touch.

An exemplary embodiment of the present invention discloses a method for user interface in a touch device. The method includes identifying a first position where a first touch is generated on a display screen, determining whether the first touch is positioned on menu items displayed on the display screen, if the first touch is not positioned on the menu items, moving the menu items to the first position in response to receiving the first touch, and if the first touch is positioned on a first menu item, displaying submenu items of the first menu item, or executing an application related to the first menu item when the first touch is released from the first menu item.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
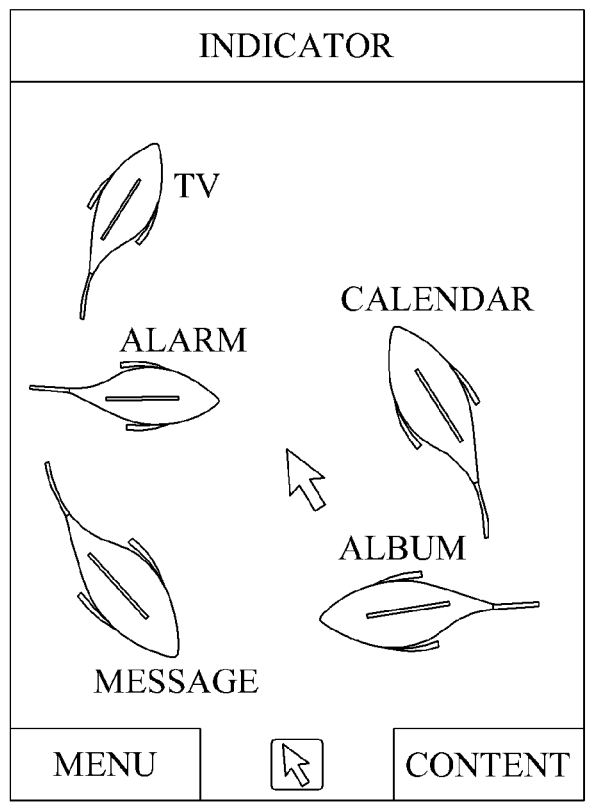
FIG. 1 and FIG. 2 are views illustrating a user interface method according to a related art.
Figure 2:
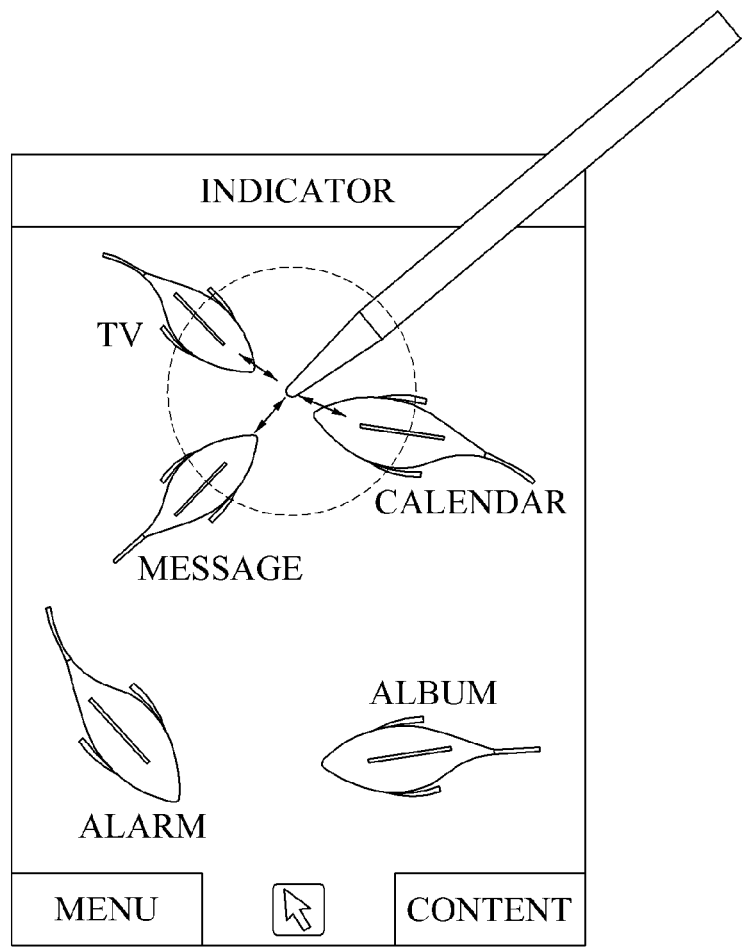

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of regions may be exaggerated for clarity. Like reference numerals in the drawings denote like elements.

A touch device generally used in the present disclosure is a device that may sense a touch to execute a selected instruction. For example, the touch device may include a personal digital assistant (PDA), a mobile telecommunication terminal, a personal computer (PC), a TV, or an automated teller machine (ATM), which is provided with a touch screen, a touch panel, a touch pad and the like.

A menu item generally described in the present disclosure is a movable object displayed on a display screen of a touch device. For example, the menu item may include a menu, an icon, or a widget, any of which may be related to an application, a data folder, state information on the touch device such as an amount of battery power remaining, and the like.

Here, the menu item may further include submenu items. The submenu items are subordinate menu items of the menu item. For example, a menu item related to 'Message' may include submenu items such as 'Receiving message box', 'Sending message box', 'Configuration' and 'Spam message'.

When the menu item is related to a data folder, files in various formats such as media files 'mp4' and 'kmp', document files 'doc' and 'hwp', and a text file 'txt', which are stored in a subordinate folder of the data folder may be included.

Figure 3:
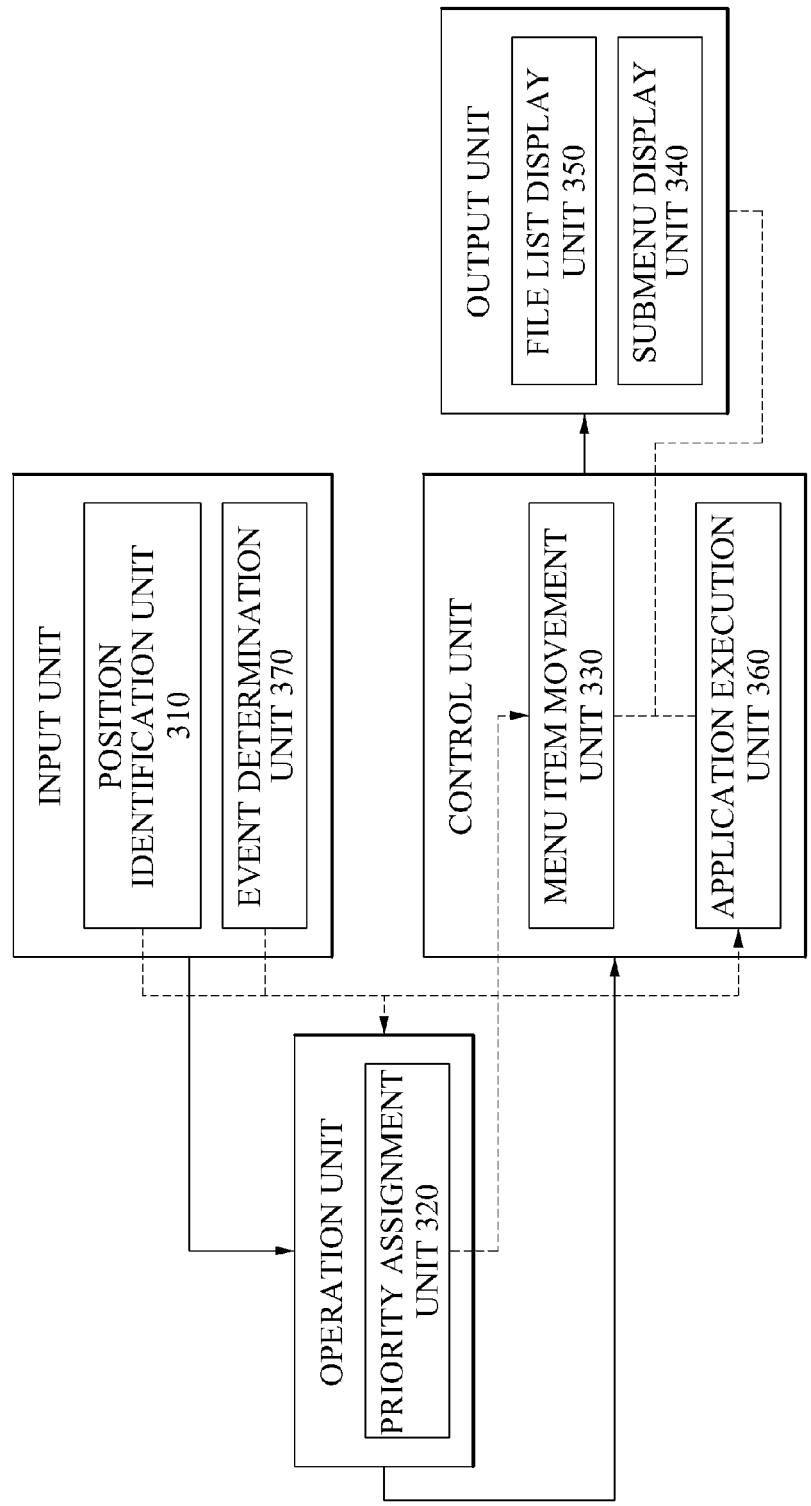
FIG. 3 is a view illustrating a configuration of a user interface apparatus in a touch device according to an exemplary embodiment of the present invention.

FIG. 3 is a view illustrating a configuration of a user interface apparatus 300 in a touch device according to an exemplary embodiment of the present invention.

The user interface apparatus 300 includes a position identification unit 310, a priority assignment unit 320, a menu item movement unit 330, a submenu display unit 340, a file list display unit 350, an application execution unit 360, and an event determination unit 370.

The event determination unit 370 determines whether a first touch is generated on a display screen. If it is determined that the first touch is generated, the position identification unit 310 identifies a first position where the first touch is generated on the display screen.

In the event determination unit 370, one or more of the various embodiments of determining whether a first or second touch is generated on the display screen may be implemented.

As an example, if a touch is maintained without being released at a predetermined position on the display screen for at least a selected time, the event determination unit 370 may determine that the first touch is generated. Further, if a touch is not released and instead is dragged to another position on the display screen after the generation of the first touch, the event determination unit 370 may determine that a second touch is generated.

As another example, if a touch is maintained at a predetermined position on the display screen for a predetermined period of time and then released, the event determination unit 370 may determine that the first touch is generated.

As still another example, if a touch-release is performed at a predetermined position on the display screen for a predetermined period of time, the event determination unit 370 may determine that the first touch is generated. In this case, the first touch is generated simply by performing the touch-release so that a further degree of freedom may be given to users.

Hereinafter, the position identification unit 310 will be described with reference to FIG. 4.

Figure 4:
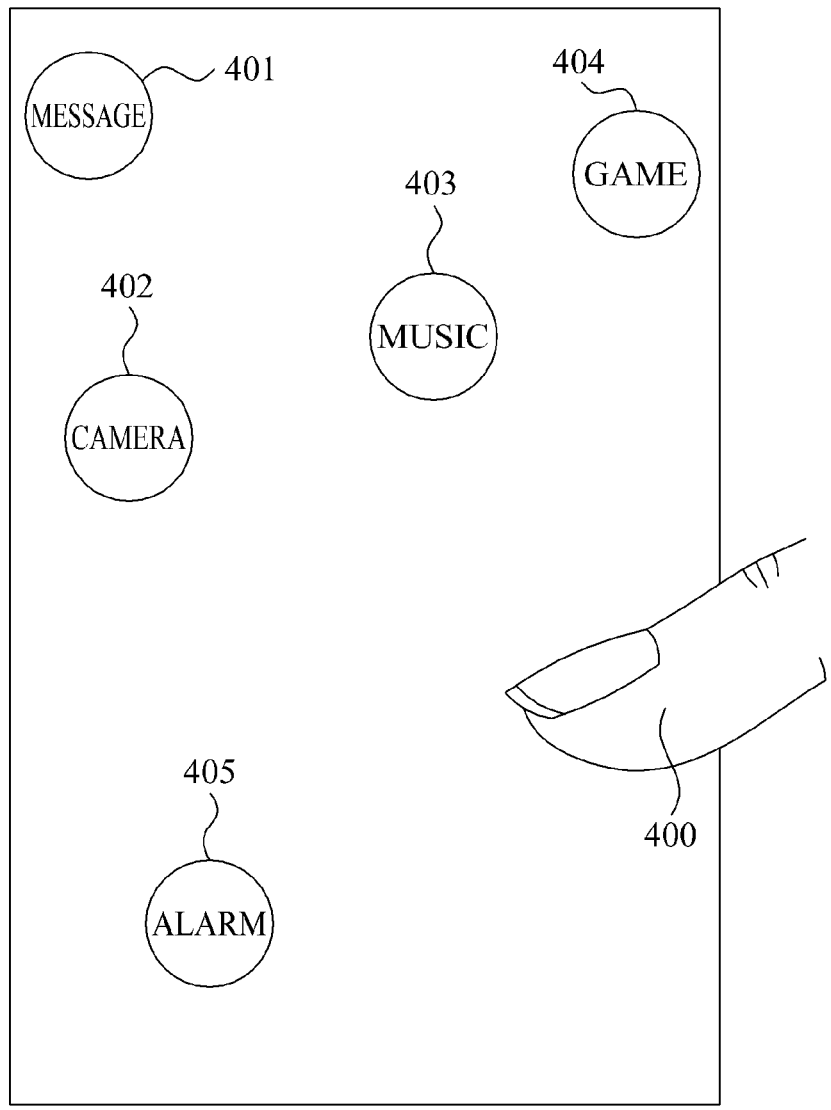
FIG. 4 is a view illustrating an example of generating a first touch in a display screen on which menu items are displayed according to an exemplary embodiment of the present invention.

FIG. 4 is a view illustrating an example of generating a first touch in a display screen on which menu items are displayed according to an exemplary embodiment of the present invention.

As illustrated in FIG. 4, the user interface apparatus 300 in the touch device allows movable menu items such as a Message 401, a Camera 402, a Music 403, a Game 404 and an Alarm 405 to be displayed on the display screen.

If the event determination unit 370 determines that a first touch 400 is generated on the display screen illustrated in FIG. 4, the position identification unit 310 may identify a first position where the first touch 400 is generated in the form of a position coordinate or pixel value.

The priority assignment unit 320 assigns priorities to the menu items displayed on the display screen.

For example, the priority assignment unit 320 may assign priorities of the menu items in an order of the Message 401, the Camera 402, the Music 403, the Game 404 and the Alarm 405, based on their respective frequencies of use.

Alternatively, the priority assignment unit 320 may assign priorities of the menu items in an order of the Music 403, the Alarm 405, the Camera 402, the Game 404 and the Message 401, based on distances of their respective initial positions to the first position where the first touch is generated.

Alternatively, the priority assignment unit 320 may assign priorities of the menu items in an order of the Message 401, the Alarm 405, the Camera 402, the Game 404, and the Music 403, based on user settings.

Alternatively, the priority assignment unit 320 may assign priorities to the menu items in comprehensive consideration of their respective frequencies of use, respective distances from the first position where the first touch 400 is generated, and/or user settings.

The menu item movement unit 330 moves the menu items to the identified first position where the first touch 400 is generated as a destination, according to the assigned priorities.

For example, the menu item movement unit 330 may sequentially move the menu items with a selected time delay, based on the assigned priorities.

Hereinafter, the menu item movement unit 330 will be described with reference to FIG. 5 and FIG. 6.

Figure 5:
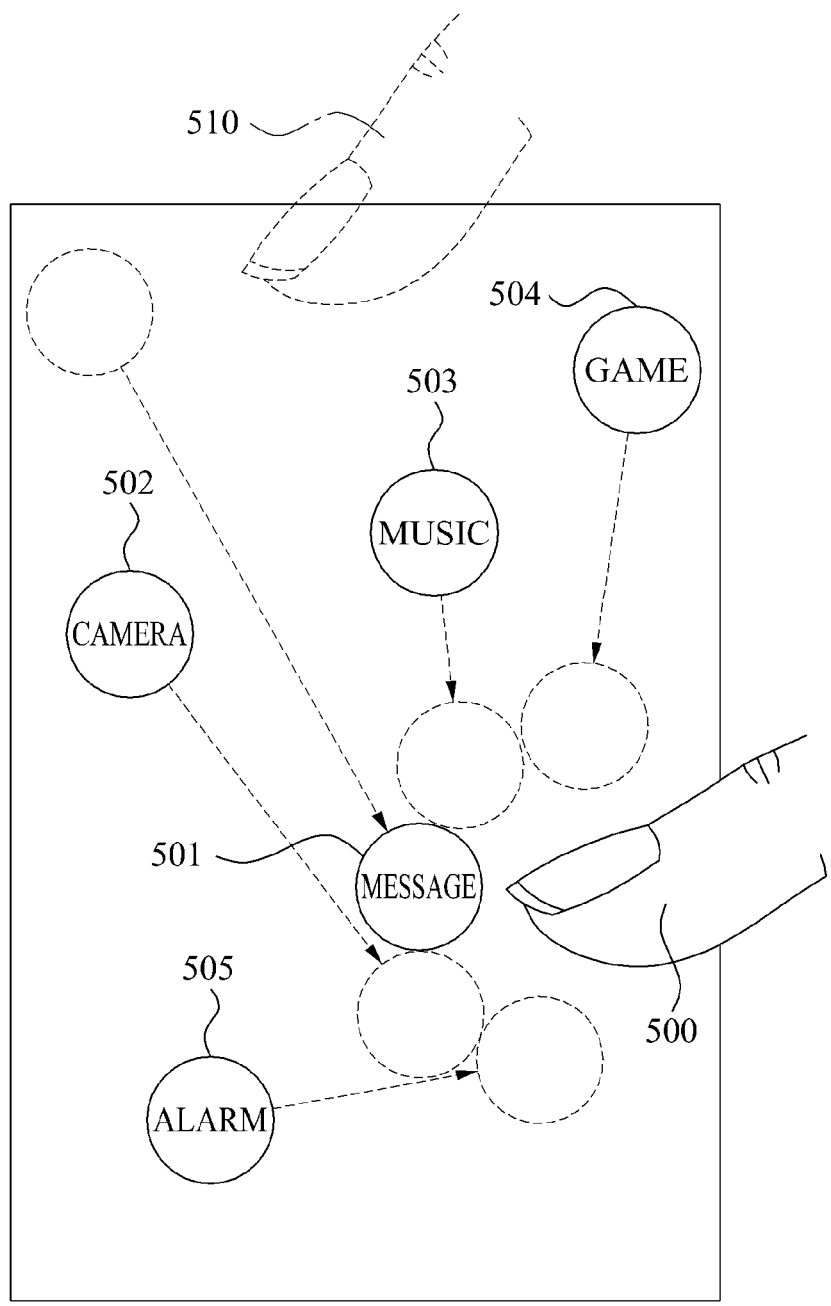
FIG. 5 is a view illustrating an example of moving menu items to a first position where a first touch is generated according to an exemplary embodiment of the present invention.

FIG. 5 is a view illustrating an example of moving menu items to a first position where a first touch 500 is generated according to an exemplary embodiment of the present invention.

If the priorities of the menu items are assigned in the order of a Message 501, a Camera 502, a Music 503, a Game 504, and an Alarm 505, the menu item movement unit 330 may move the Message 501 having a highest assigned priority among the menu items to the first position where the first touch 500 is generated.

Then, the menu item movement unit 330 may move the Camera 502 having a next highest assigned priority to the first position where the first touch 500 is generated.

Then, the menu item movement unit 330 may move the Music 503 having a next highest assigned priority to the first position where the first touch 500 is generated.

Then, the menu item movement unit 330 may move the Game 504 having a next highest assigned priority to the first position where the first touch 500 is generated.

Finally, the menu item movement unit 330 may move the Alarm 504 having the lowest assigned priority to the first position where the first touch 500 is generated.

Figure 6:
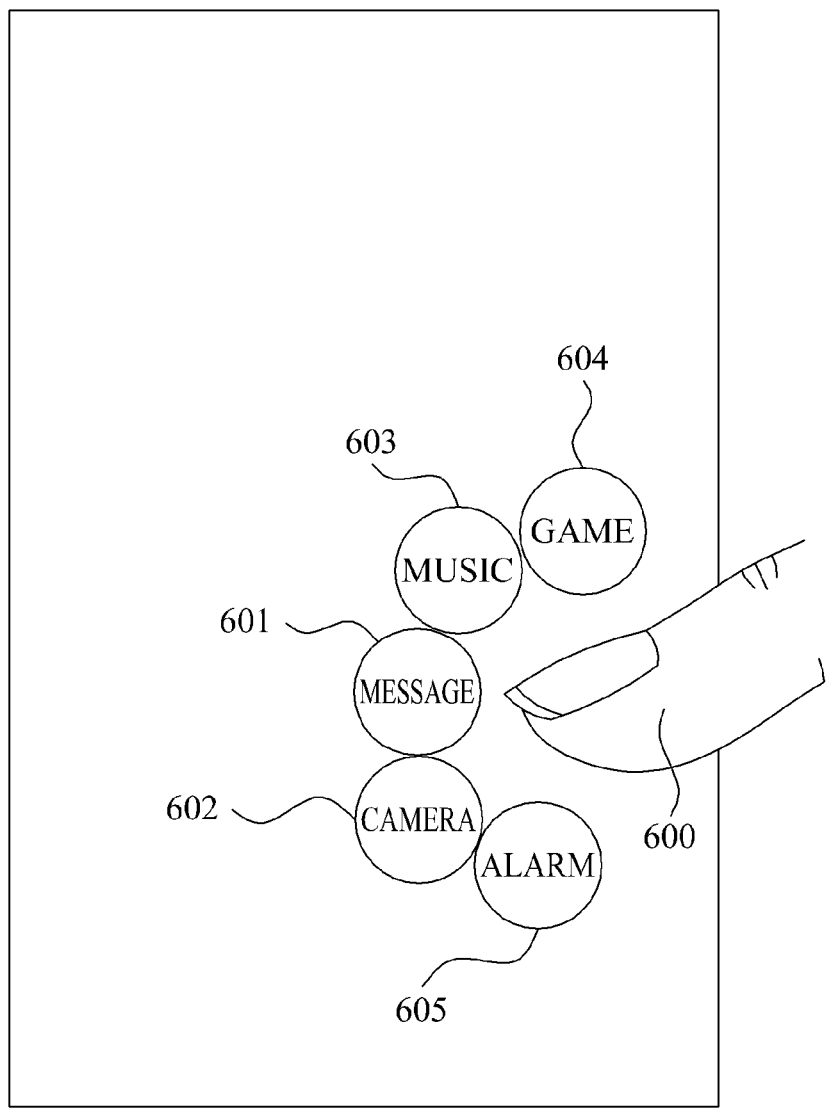
FIG. 6 is a view illustrating menu items completely moved to a first position where a first touch is generated according to an exemplary embodiment of the present invention.

FIG. 6 is a view illustrating menu items completely moved to a first position where a first touch 600 is generated according to an exemplary embodiment of the present invention.

The menu item movement unit 330 may move menu items being a Message 601, a Camera 602, a Music 603, a Game 604, and an Alarm 605 to the first position where the first touch 600 is generated in the order according to assigned priorities. As illustrated in FIG. 6, the completely moved menu items may be positioned in a circular shape around the first position.

Accordingly, although a user may touch any point on a display screen, all the menu items gather around the touched point, so that the user may more easily select a desired menu item.

Additionally, the menu items may respectively move with a time delay based on their priorities. Therefore, the user may more easily distinguish the menu items from one another even when many menu items are displayed on the display screen.

As another example, the menu item movement unit 330 may set the movement speeds of the menu items to be different from one another, so that the menu items may reach the first position based on their priorities.

Here, the menu item movement unit 330 may set the movement speeds of the menu items to be different from one another, using the respective distances of their initial positions to the first position or their respective moving times or moving speeds to the first position.

Accordingly, the menu item movement unit 330 may move menu items to the first position based on the movement speeds determined differently from one another. Consequently, the menu items may reach the first position in order of their assigned priorities.

If the first touch is repeatedly generated during a set period of time, the menu item movement unit 330 may move the menu items to the first position corresponding to the assigned priorities, which will be described with reference to FIG. 5.

If the first touch 500, such as a double click and the like, is repeatedly generated at the first position within a set period of time, the menu item movement unit 330 may move the menu items displayed on the display screen to the first position where the first touch 500 is generated. Here, the menu item movement unit 330 may move the menu items in the order of the Message 501, the Camera 502, the Music 503, the Game 504 and the Alarm 505, based on the assigned priorities. As illustrated in FIG. 6, the completely moved menu items may be arranged in a circular shape about the first position.

Alternatively, if the first touch is repeatedly generated within a set period of time, the menu item movement unit 330 may move a menu item having the highest assigned priority among the menu items to the first position, which will be described with reference to FIG. 5.

If the first touch 500, such as a double click and the like, is repeatedly generated at the first position within a set period of time, the menu item movement unit 330 may move the Message 501, having the highest assigned priority among the menu items displayed on the display screen, to the first position.

Accordingly, the movement of an undesired menu item may be omitted, and a menu item with the highest assigned priority may be more rapidly identified.

If the first touch is repeatedly generated within a set period of time, the application execution unit 360 may execute a menu item having the highest priority is assigned among the menu items. In this case, the menu item movement unit 330 may omit the movement of the menu item to the first position.

If a second touch is generated at any one of the menu items moved to the first position where the first touch is generated, the submenu display unit 340 may display submenu items included in the second touched menu item in connection with the second touched menu item.

If the second touch is generated, the menu item movement unit 330 may stop a menu item still in its initial position or moving toward the first position from moving any further toward the first position.

As an example, if the second touched menu item has two or more submenu items, the submenu display unit 340 may sequentially display the submenu items, based on priorities of the submenu items.

As another example, if the second touched menu item has no submenu item, the application execution unit 360 may execute an application related to the menu item to display the executed application on the display screen.

Here, the second touch may be generated if the first touch is dragged to a menu item and maintained without first releasing the first touch. This will be described in more detail with reference to FIG. 6.

Among the menu items moved to the first position where the first touch 600 is generated, the second touch may be generated if the first touch 600 is not released but dragged on the Message 601.

Alternatively, the second touch may be a new touch generated at a second position corresponding to a menu item that is positioned during a selected time.

As explained above, the menu item may include submenu items. For example, a menu item related to 'Message' may include submenu items such as 'Receiving message box', 'Sending message box', 'Configuration' and 'Spam message'.

Hereinafter, the submenu display unit 340 will be described with reference to FIG. 7.

Figure 7:
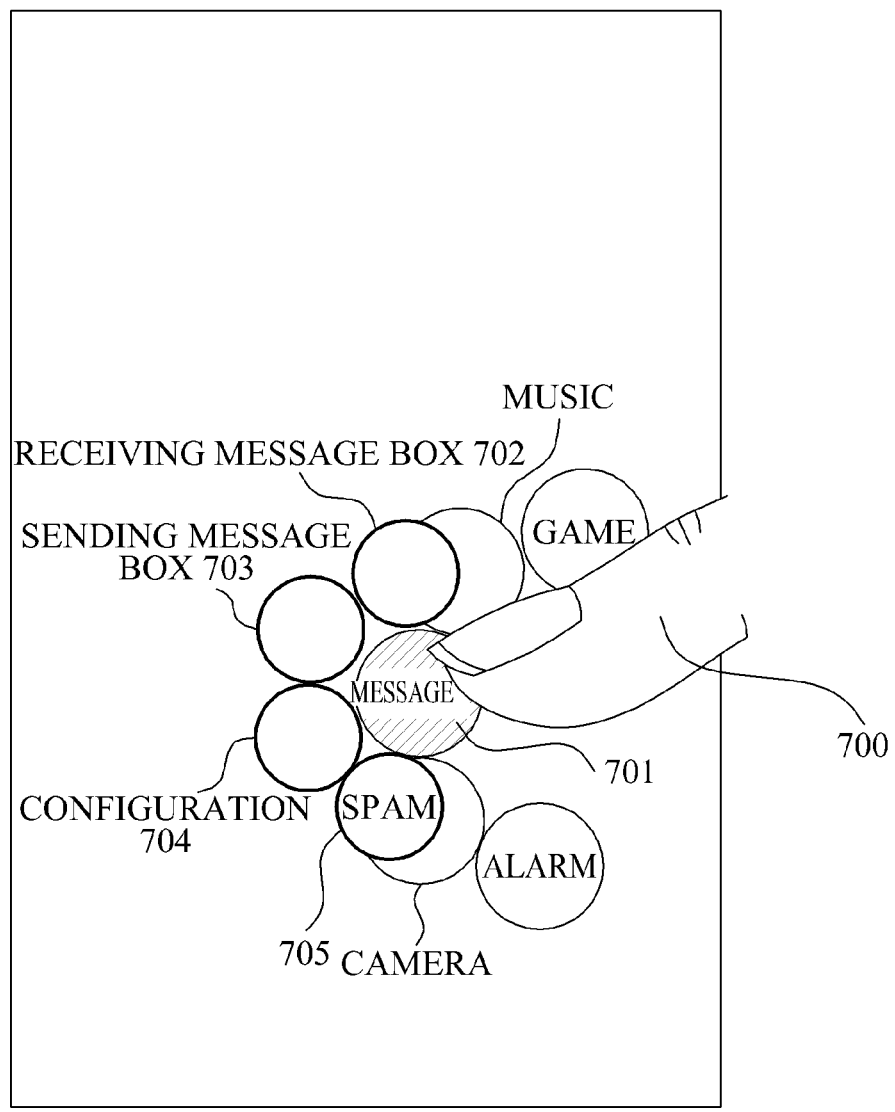
FIG. 7 is a view illustrating an example of displaying submenus included in a menu item where a second touch is generated in connection with the menu item according to an exemplary embodiment of the present invention.

FIG. 7 is a view illustrating an example of displaying submenus included in a menu item where a second touch 700 is generated in connection with the menu item according to an exemplary embodiment of the present invention.

As illustrated in FIG. 7, if the second touch 700 is generated at a Message 701, the submenu display unit 340 may display submenu items of Message 701, such as a Receiving message box 702, a Sending message box 703, a Configuration 704, and a Spam message 705, around the Message 701.

If menu priorities of the submenu items are assigned in an order of the Receiving message box 702, the Sending message box 703, the Configuration 704 and the Spam message 705, the submenu display unit 340 may sequentially display the submenu items with a time delay based on the assigned menu priorities.

Here, the menu priorities refer to priorities assigned to the submenu items. The menu properties may be assigned based on various references such as their respective frequencies of use and user settings.

Accordingly, a user may more easily reach and operate menu items and also submenu items of the menu items.

If the first touch dragged to a position on the display screen is released, the application execution unit 360 may execute an application related to a menu item located in a position corresponding to the display screen position where the first touch is released.

Hereinafter, the application execution unit 360 will be described with reference to FIG. 8.

Figure 8:
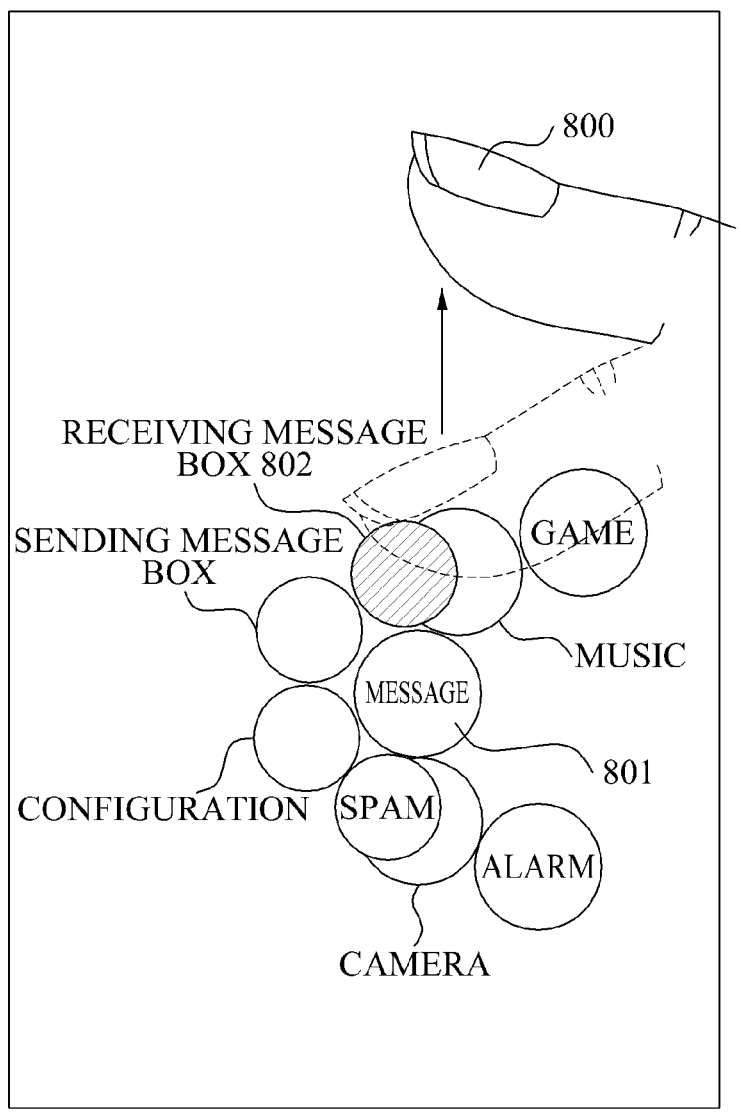
FIG. 8 is a view illustrating an example of executing an application related to a submenu if a second touch for the submenu is released according to an exemplary embodiment of the present invention.

FIG. 8 is a view illustrating an example of executing an application related to a submenu if a second touch for the submenu is released according to an exemplary embodiment is of the present invention.

As a first touch is dragged on a Message 801 among menu items completely moved to a first position, the submenu display unit 340 may display submenu items of the Message 801 around the Message 801.

If the first touch dragged on the Message 801 is then dragged on a Receiving message box 802 among the displayed submenu items and released as illustrated in FIG. 8, the application execution unit 360 executes an application related to the Receiving message box 802 so that a user may check received messages. Alternatively, if the first touch dragged on the Message 801 is then dragged to a submenu item that includes an additional submenu or documents, the additional submenu or documents may be displayed.

Alternatively, if the first touch is dragged on the Message 801 and then released, the application execution unit 360 executes an application related to the Message 801 so that the executed application may be displayed on the display screen.

Accordingly, the user may execute an application related to a menu item or a submenu item of the menu item so that menu items may be more effectively used.

If a second touch is generated at any one of the menu items completely moved to the first position where the first touch is generated or any one of the submenu items displayed, the file list display unit 350 may display a file belonging to the second touched menu item or submenu item on the display screen, in connection with the second touched menu item or submenu item.

If the second touched menu item or submenu item is related to a data folder, file in various formats such as media files 'mp4' and 'kmp', document files 'doc' and 'hwp', and a text file 'txt', which are stored in a subordinate folder of the data folder may be included.

Hereinafter, the file list display unit 350 will be described with reference to FIG. 9. Although FIG. 9 is described relative to a second touch menu item, the description of a file list display unit may be applicable to a submenu item.

Figure 9:
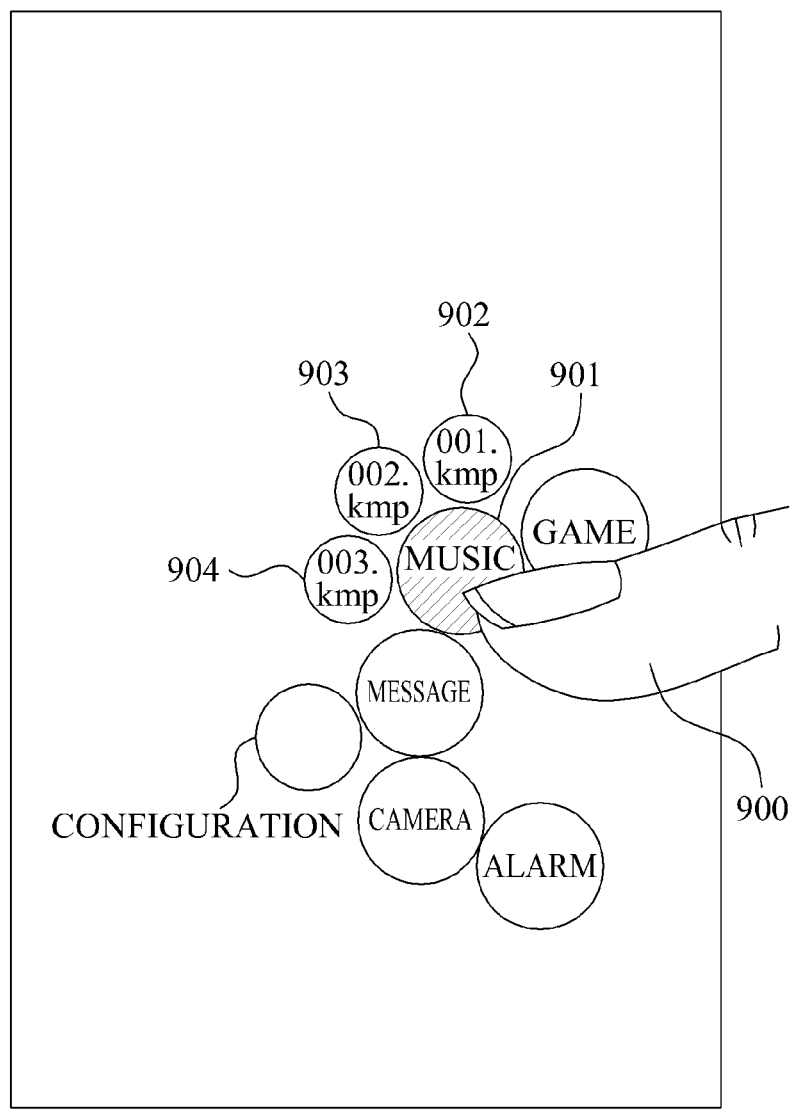
FIG. 9 is a view illustrating an example of displaying a file included in a menu item where a second touch is generated in connection with the menu item according to an exemplary embodiment of the present invention.

FIG. 9 is a view illustrating an example of displaying a file included in a menu item where a second touch 900 is generated in connection with the menu item according to an exemplary embodiment of the present invention.

Referring to FIG. 9, if the second touch 900 is generated at a Music 901 among the menu items 'Message, Camera, Music, Game and Alarm', completely moved to the first position where the first touch is generated, the file list display unit 350 displays files 001.kmp 902, 002.kmp 903 and 003.kmp 904 on the display screen in connection with the Music 901. Here, the files 001.kmp 902, 002.kmp 903, and 003.kmp 904 are subordinate to the second touched menu item, that is, the Music 901.

Accordingly, a user may more easily reach and operate menu items and also files subordinate to the menu items.

Hereinafter, another embodiment of the menu item movement unit 330 will be described with reference to FIG. 10.

Figure 10:
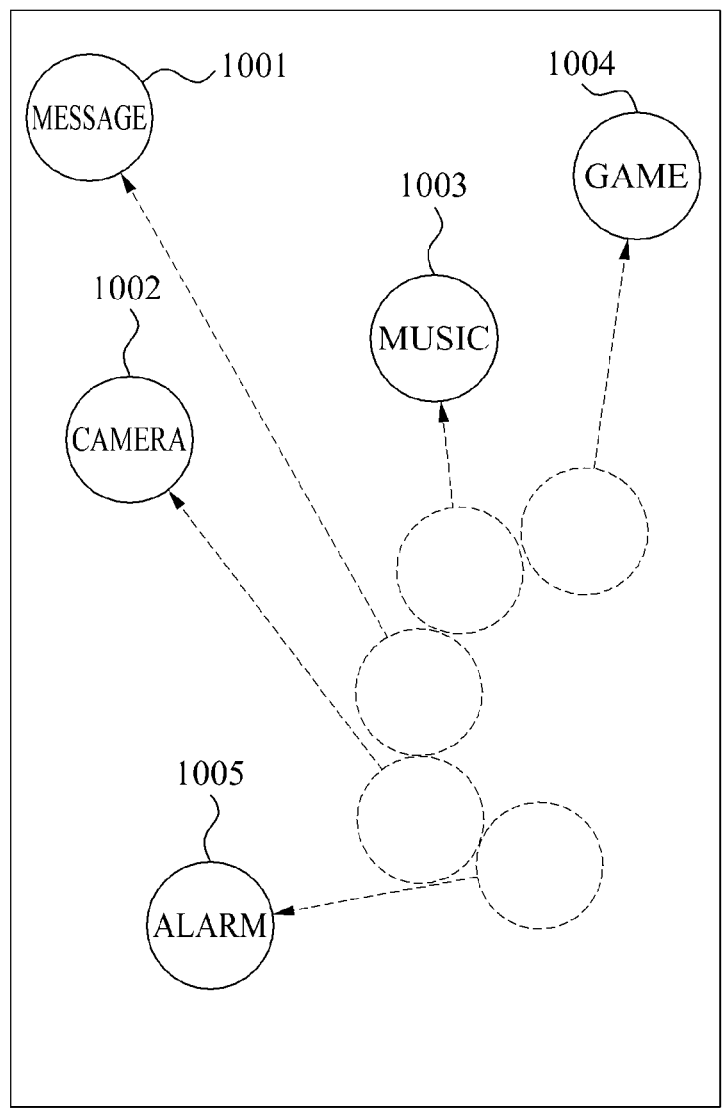
FIG. 10 is a view illustrating an example of returning menu items to their initial positions on a display screen according to an exemplary embodiment of the present invention.

FIG. 10 is a view illustrating an example of returning menu items to their initial positions on a display screen according to an exemplary embodiment of the present invention.

If a specific event occurs, the menu item movement unit 330 may return the respective menu items completely moved to the first position where the first touch is generated to their initial positions 1001, 1002, 1003, 1004, and 1005 on the display screen.

As an example, if the first touch is released at the first position where the first touch is generated, the menu item movement unit 330 may return the respective menu items is completely moved to the first position to their initial positions 1001, 1002, 1003, 1004, and 1005 on the display screen.

As another example, if the first touch is not released at the first position and is instead dragged to a second position where menu items are not displayed on the display screen and then released, the menu item movement unit 330 may return the respective menu items to their initial positions 1001, 1002, 1003, 1004, and 1005 on the display screen.

Hereinafter, an exemplary embodiment of the menu item movement unit 330 will be described with reference to FIG. 5 and FIG. 11.

Figure 11:
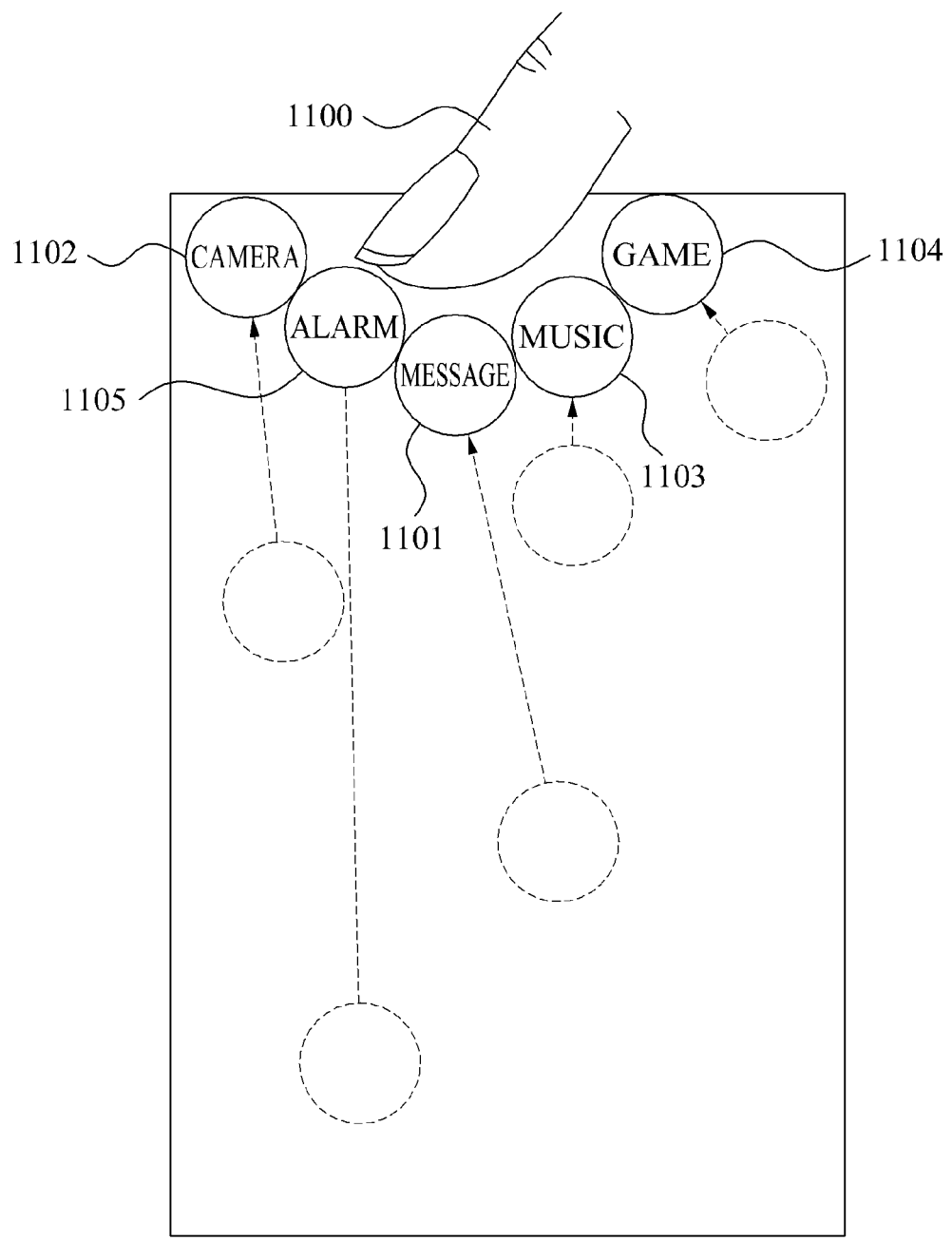
FIG. 11 is a view illustrating an example of moving menu items by changing a destination to a second position where a second touch is generated according to an exemplary embodiment of the present invention.

FIG. 11 is a view illustrating an example of moving menu items by changing a destination to a second position where a second touch is generated according to an exemplary embodiment of the present invention.

As illustrated in FIG. 5, the menu item movement unit 330 may sequentially move the menu items to the first position where the first touch 500 is generated as a destination with a selected delay time, based on respective priorities assigned to the menu items.

First, the menu item movement unit 330 may move the Message 501, to which the highest priority is assigned, to the first position where the first touch 500 is generated. If the second touch 510 is generated at the second position after Message 501 is moved but before Camera 502, having the next highest assigned priority, has reached the first position, the menu item movement unit 330 may stop the movement of the Camera 502.

As illustrated in FIG. 11, the menu item movement unit 330 may sequentially move menu items 1101, 1102, 1103, 1104, and 1105 to a second position of a second touch 1100 identified by the position identification unit 310 by changing the destination to the second position.

That is, if a second touch 1100 is generated on the display screen, the menu item movement unit 330 may stop menu items moving to the first position and move the partially stopped menu items or the menu items completely moved to the first position to the second position of the second touch 1100.

Accordingly, the menu item movement unit 330 may move the menu items completely moved to the first position or the menu items moving to the first position from the partially stopped position to the second position, without moving the same to initial positions on the display screen.

Hereinafter, an exemplary embodiment of the menu item movement unit 330 will be described with reference to FIG. 12.

Figure 12:
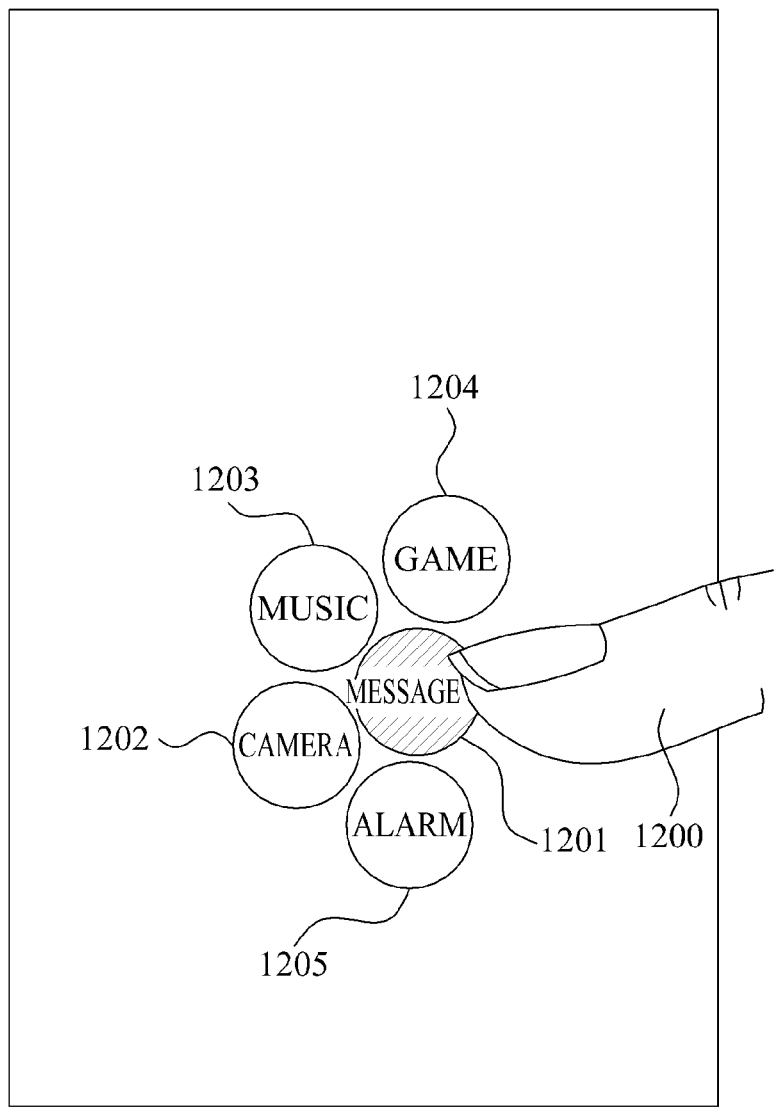
FIG. 12 is a view illustrating an example of moving the other menu items around a menu item if a second touch is generated according to an exemplary embodiment of the present invention.

FIG. 12 is a view illustrating an example of moving the other menu items around a menu item if a second touch is generated according to an exemplary embodiment of the present invention.

If a second touch is generated at any menu item completely moved to a first position, the menu item movement unit 330 may move the other menu items except the second touched menu item to a second position of the second touch identified by the position identification unit 310 by changing the destination to the second position.

Here, the menu items having a destination changed to the second destination may be menu items completely moved to the first position, menu items moving to the first position and menu items that do not start the movement to the first position due to having low priorities, except the second touched menu items.

For example, if a second touch 1200 is generated at 'Message 1201' among menu items completely moved to the first position, the menu item movement unit 330 may move all is the menu items except the second touched 'Message 1201' to the second position by changing their destination from the first position to the second position, which will be described with reference to FIG. 12.

If a second touch is generated at a Message 1201, the menu item movement unit 330 may move a Camera 1202, a Music 1203, a Game 1204, and an Alarm 1205 around the Message 1201 where the second touch 1200 is generated by changing a destination from a first position to the second position. Here, the Camera 1202 and the Music 1203 have completely moved to the first position when the second touch is generated. The Game 1204 is moving to the first position when the second touch is generated. The Alarm 1205 has not yet started the movement to the first position due to having lowest priority.

Accordingly, it is possible to improve the reaching and operating convenience for menu items displayed on the display screen.

Referring back to FIG. 3, the user interface apparatus 300 in the touch device may include an input unit to sense and detect an event such as a touch, a release, or a dragged touch; an operation unit to determine movement speeds of menu items using data transmitted from the input unit; a control unit to control the movement, arrangement and execution of menu items; and an output unit to display the movement and arrangement of menu items and the execution of applications related to the menu items on a display screen.

The input unit may include the event determination unit 370 to determine an event such as a touch, a release or a dragged touch, and the position identification unit 310 to detect a touched position.

If a touch is generated at a position on the display screen of the touch device, the input unit may detect the touched position and transmit information on the touched position to is the operation unit. The operation unit may determine movement speeds of menu items distributed on the display screen, using the information on the touched position.

The control unit may control the output unit so that the respective menu items with the determined movement speeds are moved and disposed around the touched position at different speeds. Here, the treatment of the display screen may be performed by the output unit.

The control unit may include the menu item movement unit 330 to control the movement and arrangement of menu items around a touched position, the movement of menu items to their initial positions and the like, and the application execution unit 360 to perform the execution and cancellation of applications related to menu items, the arrangement and execution of submenu items and the like.

Hereinafter, a user interface method in a touch device will be described with reference to FIG. 13 and FIG. 14. For ease of description, and not as a limitation for performing the method, the method will be described with further reference to FIG. 3.

Figure 13:
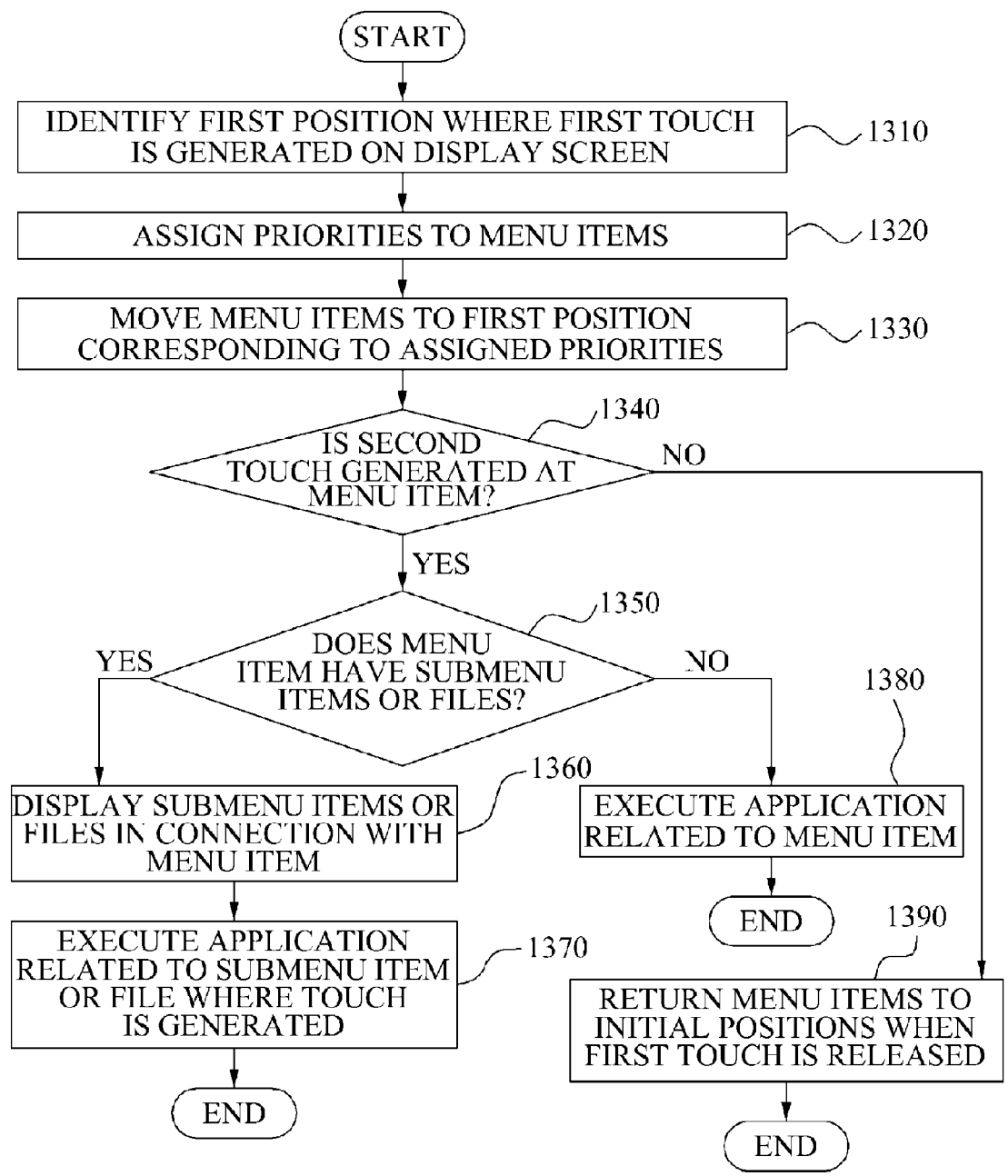
FIG. 13 is a flowchart illustrating a user interface method in a touch device according to an exemplary embodiment of the present invention.

FIG. 13 is a flowchart illustrating a method for user interface in a touch device according to an exemplary embodiment of the present invention.

The method for user interface may be implemented by the user interface apparatus 300 in the touch device according to an exemplary embodiment of the present invention.

In operation 1310, the user interface apparatus 300 identifies a first position where a first touch is generated on a display screen.

If it is determined that a first touch 400 is generated by the event determination unit 370 on the display screen illustrated in FIG. 4, the position identification unit 310 may identify a first position where the first touch 400 is generated in the form of a position coordinate or pixel value.

In operation 1320, the user interface apparatus 300 assigns priorities to the menu items displayed on the display screen.

The priority assignment unit 320 may assign priorities to the menu items in comprehensive consideration of their respective frequencies of use, respective distances from the first position, and/or user settings.

In operation 1330, the user interface apparatus 300 move the menu items to the identified first position on the display screen according to the assigned priorities.

As an example, the menu item movement unit 330 may sequentially move the menu items with a selected time delay, based on the assigned priorities.

Accordingly, although the user may touch any point on a display screen, all the menu items gather around the touched point, so that the user may more easily select a desired menu item.

Here, the menu items may be moved with a time delay based on their assigned priorities. Therefore, the user may more easily distinguish the menu items from one another even if many menu items are displayed on the display screen.

As another example, the menu item movement unit 330 determines the movement speeds of the menu items to be different from one another so that the menu items may reach the first position at different times based on their assigned priorities.

Here, the menu item movement unit 330 may determine the movement speeds of the menu items to be different from one another, using the respective distances between their initial positions and the first position or the respective moving times of the menu items to the first position.

Accordingly, the menu item movement unit 330 may move menu items to the first is position based on the movement speeds determined differently from one another. Consequently, the menu items may reach the first position in the order of the assigned priorities.

In operation 1340, the user interface apparatus 300 determines whether a second touch is generated at any one of the menu items completely moved to the first position.

If it is determined in operation 1340 that the second touch is generated at a menu item completely moved to the first position, the user interface apparatus 300 determines whether the second touched menu item has submenu items or files in operation 1350.

If it is determined in operation 1350 that the second touched menu item has submenu items or files, the user interface apparatus 300 displays the submenu items or files belonging to the second touched menu item on the display screen in operation 1360.

If menu priorities of the submenu items are assigned in the order of the Receiving message box 702, the Sending message box 703, the Configuration 704 and the Spam message 705, the submenu display unit 340 may sequentially display the submenu items with a time delay, based on the assigned priorities.

Here, the menu priorities refer to priorities assigned to the submenu items. The menu properties may be assigned based on various references such as their respective frequencies of use and/or user settings.

Accordingly, the user may more easily reach and operate menu items and also submenu items of the menu items.

In operation 1370, the user interface apparatus 300 executes the application related to the touch generated at the displayed submenu item or executes a file related to the touch generated at the displayed submenu item.

If it is determined in operation 1350 that the second touched menu item has no submenu item or file, in operation 1380, the user interface apparatus executes an application related to the menu item to display the executed application on the display screen.

If it is determined in operation 1340 that a second touch is not generated at the menu items completely moved to the first position, in operation 1390, the user interface apparatus 300 returns the menu items to their initial positions if the first touch is released, which is described with reference to FIG. 10.

As an example, if the first touch is released at the first position where the first touch is generated, the menu item movement unit 330 may immediately return the respective menu items completely moved to the first position to their initial positions 1001, 1002, 1003, 1004, and 1005 on the display screen.

As another example, if the first touch is dragged to a second position where menu items are not displayed on the display screen and then released where no menu items are displayed, the menu item movement unit 330 may return the menu items to their respective initial positions 1001, 1002, 1003, 1004, and 1005 on the display screen.

Figure 14:
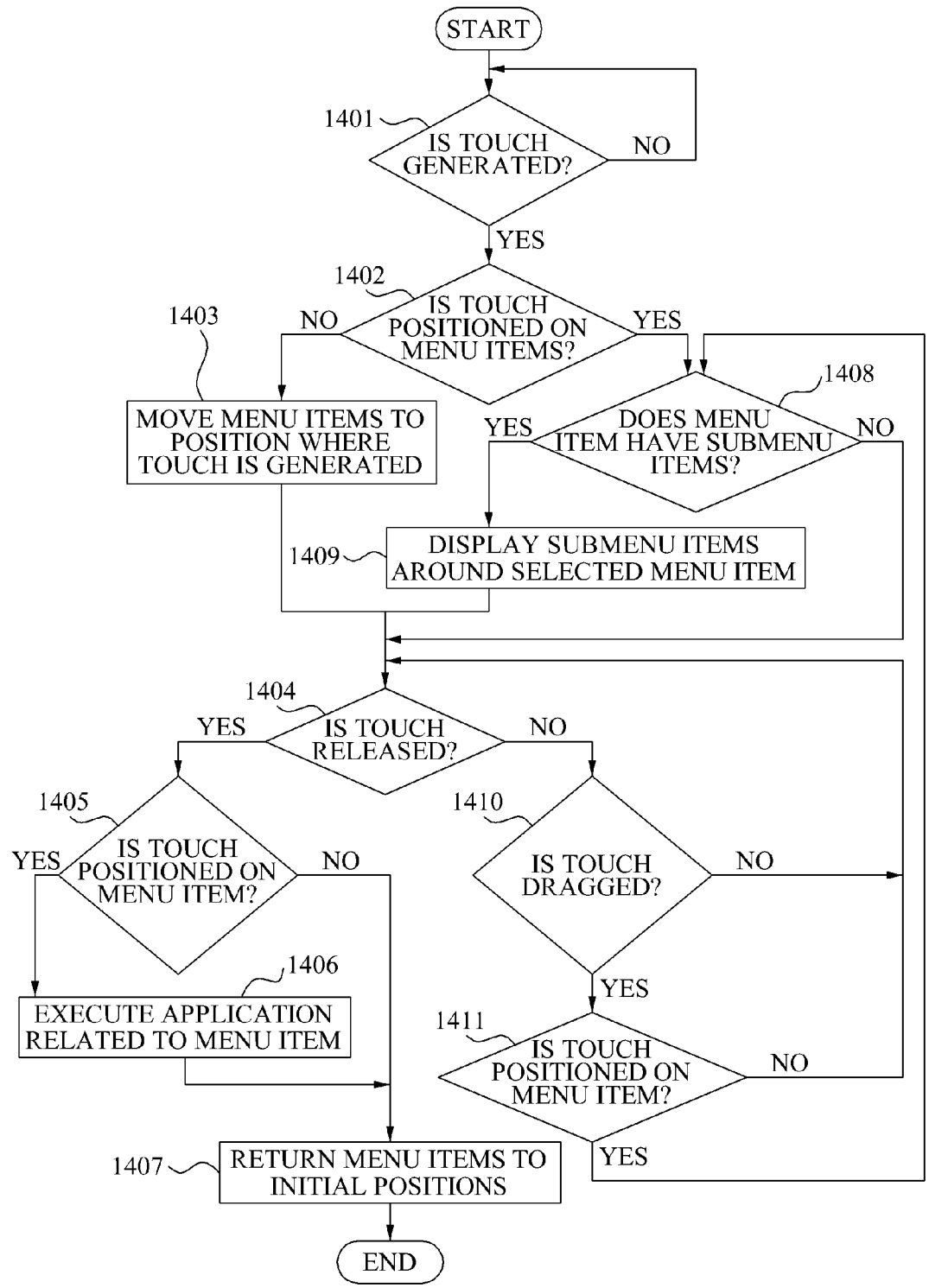
FIG. 14 is a flowchart illustrating a user interface method in a touch device according to an exemplary embodiment of the present invention.

FIG. 14 is a flowchart illustrating a user interface method in a touch device according to an exemplary embodiment of the present invention.

The user interface method may be implemented by the user interface apparatus 300 in the touch device according to an exemplary embodiment of the present invention.

In operation 1401, the user interface apparatus 300 determines whether a first touch is generated on a display screen.

As an example, if the first touch is not released and is maintained on the display screen, the event determination unit 370 may determine that the first touch is generated. If the first touch is dragged while being maintained, the event determination unit 370 may determine that a second touch is generated.

Alternatively, if the first touch is maintained on the display screen for a selected time and then released, the event determination unit 370 may determine that the first touch is generated. Alternatively, if the first touch is generated and then released on the display screen, the event determination unit 370 may determine that the first touch is generated. Here, the user releases the first touch on the display screen, and therefore, may have improved freedom of movement.

If it is determined in operation 1401 that the first touch is not generated, operation 1401 may be repeatedly performed.

If it is determined in operation 1401 that the first touch is generated, the user interface apparatus 300 determines whether the first touch is positioned on menu items in operation 1402.

If it is determined in operation 1402 that the first touch is not positioned on the menu items, the user interface apparatus 300 moves the menu items to the first position where the first touch is generated as a destination in operation 1403.

In operation 1404, the user interface apparatus 300 determines whether the first touch is released.

If it is determined in operation 1404 that the first touch is released, the user interface apparatus 300 determines whether the first touch is released on a menu item in operation 1405.

If it is determined in operation 1405 that the first touch is released on the menu item, the user interface apparatus 300 executes an application related to that menu item in operation 1406. Then, in operation 1407, the user interface apparatus 300 returns the menu items completely moved to the first position to their initial positions on the display screen.

If it is determined in operation 1405 that the first touch is not released on the menu item, in operation 1407, the user interface apparatus 300 returns the menu items completely moved to the first position to their initial positions on the display screen.

If it is determined in operation 1402 that the first touch is positioned on a menu item, the user interface apparatus 300 determines whether the menu item has submenu items in operation 1408.

If it is determined in operation 1408 that the menu item has submenu items, the user interface apparatus 300 displays the submenu items belonging to the menu item around the menu item in operation 1409. The user interface apparatus 300 then determines whether the first touch is released in operation 1404.

If it is determined in operation 1408 that the menu item has no submenu items, the user interface apparatus 300 determines whether the first touch is released in operation 1404.

If it is determined in operation 1404 that the first touch is not released, the user interface apparatus 300 determines whether the first touch is dragged in operation 1410.

If it is determined in operation 1410 that the first touch is dragged, the user interface apparatus 300 determines whether the first touch is dragged on a menu item in operation 1411.

If it is determined in operation 1411 that the first touch is dragged on the menu item, the user interface apparatus 300 determines whether the menu item on which the first touch is dragged has submenu items in operation 1408.

If it is determined in operation 1410 that the first touch is not dragged or if it is determined in operation 1411 that the first touch is not dragged on the menu item, the user interface apparatus 300 determines whether the first touch is released in operation 1404.

The user interface method in a touch device according to the above-described exemplary embodiments of the present invention may be recorded in computer-readable media including program instructions to implement various operations when executed by a computer. The media may also include, alone or in combination with the program instructions, data files, data structures, and the like. Examples of computer-readable media include magnetic media such as hard disks, floppy disks, and magnetic tape; optical media such as CD-ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

According to an exemplary embodiment of the present invention, the convenience in selecting and operating menu items may be provided to a user, and the user may more easily distinguish the menu items from one another.

Further, according to an exemplary embodiment of the present invention, priorities may be assigned to menu items based on various references such as their respective frequencies of use, respective distances from the first position, and/or user settings.

Further, according to an exemplary embodiment of the present invention, the movement speeds of menu items may be different from one another, so that the menu items may approach a first position where a first touch is generated in an order corresponding to assigned priorities.

Further, according to an exemplary embodiment of the present invention, the convenience in selecting and operating submenu items related to a second touched menu item may also be provided.

Further, according to an exemplary embodiment of the present invention, the user may more easily execute an application related to a menu item so that menu items may be more effectively used.

Further, according to an exemplary embodiment of the present invention, if a first touch is repeatedly generated at the same position within a set period of time, only a menu item with the highest priority may be selectively moved to the position so that a user may more rapidly identify the menu item with the highest priority, and an application related to the menu item may be executed.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A user interface apparatus in a touch device, comprising:
    a display screen;
    a position identification unit to identify a first position where a first touch is inputted on the display screen;
    a priority assignment unit to respectively assign priorities of movement to menu items displayed on the display screen; and
    a menu item movement unit to move the menu items to the first position according to the assigned priorities of movement in response to receiving the first touch,
    wherein the priority assignment unit assigns priorities of movement to the menu items based on at least one of respective frequencies of use, respective distances from the first position, and user settings; and
    the menu item movement unit sets movement speeds of the menu items so that the menu items approach the first position in order of the assigned priorities of movement.

2. The user interface apparatus of claim 1, further comprising:
    a submenu display unit to display submenu items belonging to a second touched menu item on the display screen in connection with the second touched menu item if a second touch is inputted at the second touched menu item.

3. The user interface apparatus of claim 2, wherein the submenu items belonging to the second touched menu item are sequentially displayed based on assigned priorities of displaying of the submenu items.

4. The user interface apparatus of claim 2, wherein the menu item movement unit moves the menu items except the second touched menu item to a second position of the second touch identified by the position identification unit.

5. The user interface apparatus of claim 1, wherein if a second touch is inputted on the display screen, the position identification unit identifies a second position where the second touch is inputted, and the menu item movement unit moves the menu items to the second position of the second touch.

6. The user interface apparatus of claim 1, further comprising:
    an application execution unit to execute an application related to a completely moved menu item if the first touch is dragged to a position where the completely moved menu item is displayed on the display screen and is released.

7. The user interface apparatus of claim 1, wherein if the first touch is dragged to a position corresponding to no menu items and is released, the menu item movement unit returns the menu items to their respective initial positions on the display screen.

8. The user interface apparatus of claim 1, wherein if the first touch is repeatedly inputted during a period of time, the menu item movement unit moves the menu items according to the assigned priorities.

9. The user interface apparatus of claim 1, wherein if the first touch is repeatedly inputted during a period of time, the menu item movement unit moves only a menu item having the highest priority among the menu items to the first position.

10. The user interface apparatus of claim 1, further comprising:
    an application execution unit to execute a menu item,
    wherein if the first touch is repeatedly inputted during a period of time, the application execution unit executes a menu item having the highest priority among the menu items.

11. The user interface apparatus of claim 1, further comprising:
a file list display unit to display files related to a second touched menu item on the display screen if a second touch is inputted at the second touched menu item moved to the first position.

12. The user interface apparatus of claim 1, wherein the menu item movement unit determines movement speeds of the menu items by using the respective initial positions of the menu items, respective distances from the first position, or respective movement times to the first position so that the menu items are moved to the first position in order of the assigned priorities of movement.

13. A method for user interface in a touch device, comprising:
identifying a first position where a first touch is inputted on a display screen;
respectively assigning priorities of movement to menu items displayed on the display screen; and
moving the menu items to the first position according to the assigned priorities of movement in response to receiving the first touch,
wherein the priorities of movement are assigned based on at least one of respective frequencies of use, respective distances from the first position, and user settings; and
movement speeds of the menu items are set so that the menu items approach the first position in order of the assigned priorities of movement.

14. The method of claim 13, further comprising:
displaying submenu items belonging to a second touched menu item on the display screen in connection with the second touched menu item if a second touch is inputted at the second touched menu item.

15. The method of claim 13, further comprising:
returning the menu items to their respective initial positions on the display screen if the first touch is dragged to a position corresponding to no menu items and is released.

* * * * *